(12) United States Patent
Fioravanti (10) Patent No.: US 8,322,776 B2
(45) Date of Patent: Dec. 4, 2012

(54) AUTOMOBILE VEHICLE WITH A WIPERLESS CLEANING SYSTEM FOR GLAZED SURFACES AND THE LIKE

(75) Inventor: Leonardo Fioravanti, Moncalieri (IT)

(73) Assignee: Fioravanti SRL, Turin (IT)

( * ) Notice: Subject to any disclaimer, the term of this patent is extended or adjusted under 35 U.S.C. 154(b) by 223 days.

(21) Appl. No.: 12/741,717

(22) PCT Filed: Nov. 7, 2008

(86) PCT No.: PCT/IB2008/054658
§ 371 (c)(1),
(2), (4) Date: May 6, 2010

(87) PCT Pub. No.: WO2009/060413
PCT Pub. Date: May 14, 2009

(65) Prior Publication Data
US 2010/0230991 A1 Sep. 16, 2010

(30) Foreign Application Priority Data

Nov. 9, 2007 (IT) .............................. TO2007A0798
Dec. 28, 2007 (IT) .............................. TO2007A0952

(51) Int. Cl.
*B60S 1/52* (2006.01)
*B60S 1/54* (2006.01)
(52) U.S. Cl. ................................. 296/96.15; 15/250.01
(58) Field of Classification Search ............... 296/96.15; 15/250.01; 239/284
See application file for complete search history.

(56) References Cited

U.S. PATENT DOCUMENTS 1,502,821 A * 7/1924 Harrington ................. 239/284.1
(Continued)

FOREIGN PATENT DOCUMENTS

DE 1 655 137 A 12/1971
(Continued)

*Primary Examiner* — Glenn Dayoan
*Assistant Examiner* — Gregory Blankenship
(74) *Attorney, Agent, or Firm* — Sughrue Mion, PLLC (57) ABSTRACT

The automobile vehicle (1) having a bodywork (2) in which a member or panel (W) is mounted and is operationally cleaned without wipers, a frame (3) being associated with its perimeter or contour. The surface of the member or panel (W) which is external in operation is water-repellent. Ejector means (5, 6, A, B) associated with the member or panel (W) comprise:
  a first plurality of openings or nozzles (A) for the discharge of a liquid provided in the frame (3), oriented towards the external surface of the member or panel (W),
  a second plurality of openings or nozzles (B) for the discharge of a gaseous fluid also provided in the frame (3) and interspersed with the openings or nozzles (A) of the first plurality,
  a first manifold duct (5) provided in the frame (3) and communicating with at least part of the liquid discharge openings or nozzles (A), and
  a second manifold duct (6) provided in the frame (3) and communicating with at least part of the discharge openings or nozzles (B) of the gaseous fluid.
The first and second manifold ducts (5, 6) are connected to respective supply devices (10, 14) adapted to supply them with a flow of liquid and a flow of gaseous fluid respectively. The preferably combined action of the jets of liquid and gaseous fluid emitted through the openings or nozzles (A, B) is adapted to cause a turbulent movement of the liquid on the external surface of the member or panel (W) and of the materials which may be incorporated in this liquid.

18 Claims, 5 Drawing Sheets

U.S. PATENT DOCUMENTS

| | | | | |
|---|---|---|---|---|
| 1,932,615 A | * | 10/1933 | Bumpass | 239/284.1 |
| 2,643,909 A | * | 6/1953 | Foster | 296/95.1 |
| 2,701,897 A | * | 2/1955 | Leming | 239/284.1 |
| 4,387,853 A | * | 6/1983 | Sarai et al. | 239/284.1 |
| 4,832,262 A | * | 5/1989 | Robertson | 239/129 |
| 5,403,060 A | | 4/1995 | Durand et al. | |
| 5,657,929 A | | 8/1997 | DeWitt et al. | |
| 5,799,358 A | * | 9/1998 | Unverrich | 15/250.01 |
| 5,820,026 A | * | 10/1998 | Raghu | 239/284.1 |
| 7,080,872 B1 | * | 7/2006 | Simonowits | 296/96.15 |
| 7,537,262 B2 | * | 5/2009 | Terakawa | 296/96.15 |
| 7,941,890 B1 | * | 5/2011 | Alexander et al. | 15/250.01 |
| 2004/0084069 A1 | | 5/2004 | Woodard | |
| 2010/0230991 A1 | * | 9/2010 | Fioravanti | 296/96.15 |
| 2011/0197384 A1 | * | 8/2011 | Grandjean et al. | 15/250.01 |

FOREIGN PATENT DOCUMENTS

| | | | |
|---|---|---|---|
| EP | 0 587 477 A1 | 3/1994 | |
| GB | 2 192 023 A | 12/1987 | |
| JP | 55059043 * | 5/1980 | 15/250.01 |
| JP | 56039942 * | 4/1981 | 15/250.01 |
| JP | 63-279953 A | 11/1988 | |
| JP | 08-268232 A | 10/1996 | |
| JP | 10-147214 A | 6/1998 | |
| JP | 10-250534 A | 9/1998 | |

* cited by examiner

AUTOMOBILE VEHICLE WITH A WIPERLESS CLEANING SYSTEM FOR GLAZED SURFACES AND THE LIKE

The present invention relates in general to an automobile vehicle provided with a wiperless cleaning system for glazed surfaces and the like, such as the windscreen, the rear window, the side window lights, any transparent roof, the external surfaces of lighting units, etc.

The invention relates more particularly to an automobile vehicle of the type defined in the preamble of the appended claim 1.

In this specification and in the accompanying claims, the term "automobile vehicle" is understood in a broad sense as any means of land, water or air transport.

A wiperless cleaning system for the windscreen of an automobile vehicle is known from Japanese Patent Application JP 10147214-A, in which a film of fluorided silicone resin is applied to the windscreen to make it water-repellent. A manifold runs along the base of the windscreen, at a certain distance from its frame, and supplies a flow of pressurised gas, in particular exhaust gas from the automobile vehicle engine, to nozzles which direct jets of this gas towards the base of the windscreen.

A system is known from Japanese Patent Application JP 10250534-A in which a fan is disposed at the base of the windscreen of an automobile vehicle so that a flow of air can be blown towards its water-repellent external surface to remove the water (rain) which has fallen thereon.

A system for removing droplets of water (rain) from the panes of automobile vehicle windows is also known from Japanese Patent Application JP 8268232-A. The external surface of these panes is provided with a layer of hydrophobic material and piezoelectric transducers are associated with the panes in order to cause them to vibrate to make it easier for water droplets to run downwards under the effect of gravity.

An object of the present invention is to provide an automobile vehicle with an improved wiperless cleaning system.

This and other objects are achieved in accordance with the invention by an automobile vehicle having the characteristic features set out in the appended claim 1.

Other advantages and features of the present invention will become clear from the following detailed description which is given with reference to the appended drawings which are provided purely by way of non-limiting example and in which.

Figure 1:
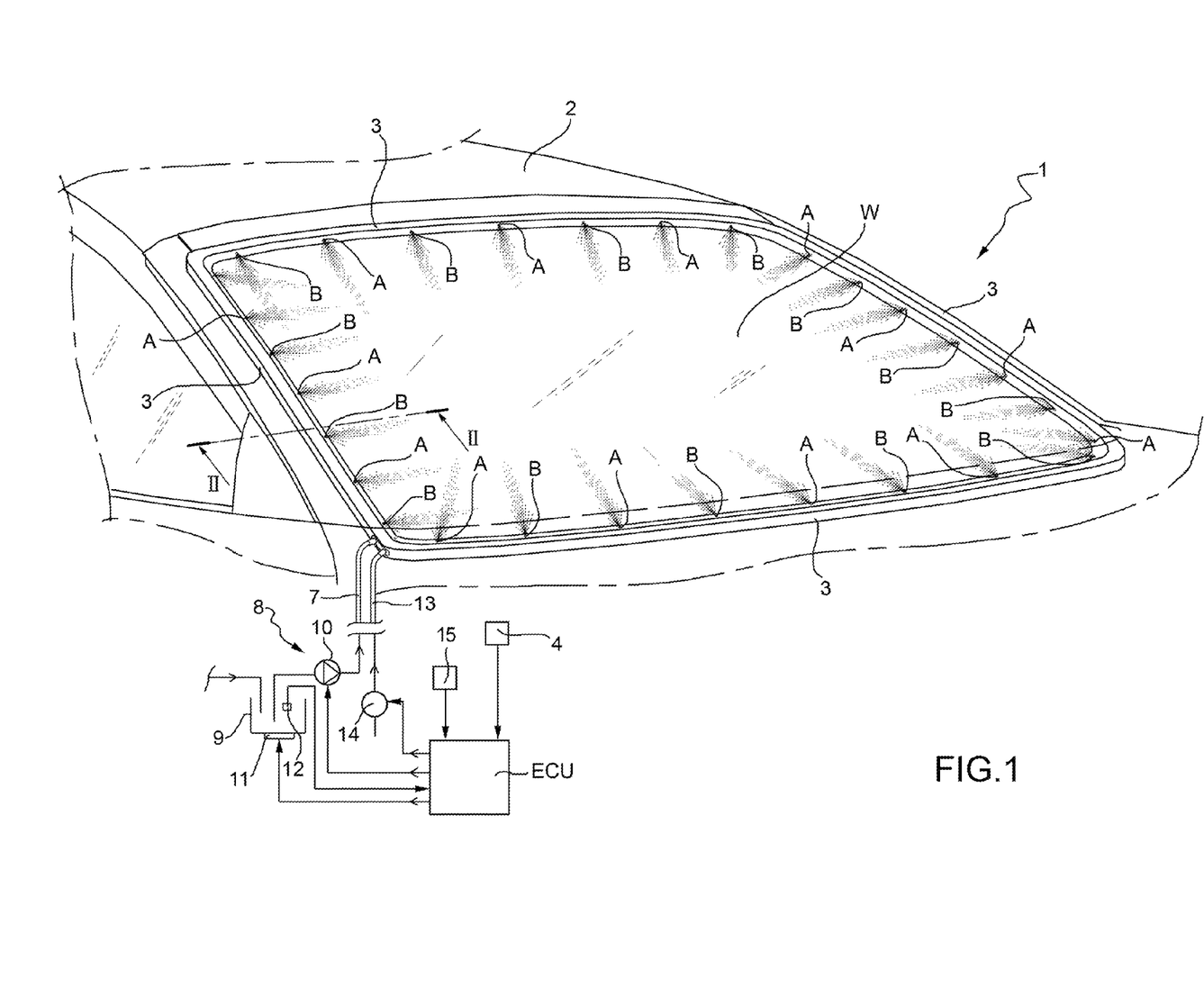
FIG. 1 is a partial perspective view, partly in diagram form, of an automobile vehicle provided with a cleaning system of the present invention.

In FIG. 1, an automobile vehicle is shown overall by 1 and comprises a bodywork 2 in which a member or panel W which is at least partially transparent is mounted. The member or panel W of FIG. 1 may be the front windscreen or the rear window.

A frame 3 is associated with the perimeter or contour of the windscreen W. In the embodiment shown by way of example in FIGS. 1 and 2, this frame is formed by an assembly and sealing gasket made, for instance, from elastomeric material. This frame or gasket may be produced separately from the panel W or may be encapsulated or duplicate moulded on the panel W.

In alternative embodiments, not shown, the frame 3 may be made from other materials, for instance a metal material, or could even be produced integrally with the bodywork opening in which the panel W is mounted.

The surface of the panel W which is external in operation is hydrophobic, i.e. water-repellent. This can be obtained in many known ways, for instance by applying an ultra-thin transparent film, obtained by a nanotechnology process, for instance a film of water-repellent titanium dioxide also adapted to act as a sun filter. As an alternative, a nanostructured film may be applied to the external surface of the panel W in order artificially to reproduce the known super-hydrophobic effect of lotus leaves.

The surface of the panel W which is external in operation may also have a layer of highly reactive nanopowder deposited on it, which can be activated by electrical pulses, for instance by means of conducting films deposited on the panel W and adapted to have an efficient fragmenting effect on the molecules of the "dirt" which may typically be deposited on the panel.

These conducting films, like the further films mentioned below, may be part of (at least) a substantially essentially transparent conducting layer deposited on the panel W.

In the case of a nanostructured external surface, such a surface may be associated with nanomotor devices (which may be supplied by photovoltaic effect or electrically by supply conductors formed as transparent conducting films deposited on the panel W) in order to "sweep", in the form of a "nano-broom", the micro and nano particles deposited on the panel.

The panel W may be associated with one or a plurality of optical rain sensors for the functions which will be described below. For purely illustrative purposes, such a rain sensor is shown by 4 in FIG. 1. A film deposited on the panel, in a manner known per se, may also be used as a rain sensor.

The panel W shown in the drawings has a conventional configuration (curvature).

In general, the panel W is associated with an ejection system so that a plurality of jets of fluid, in particular a plurality of jets of liquid, preferably water, and a plurality of jets of a gaseous fluid, preferably air, can be directed towards its external surface.

Figure 2:
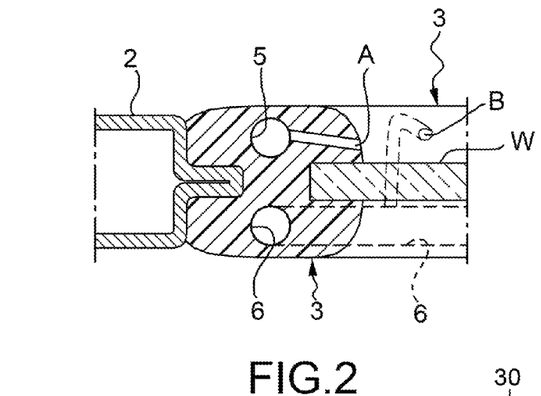
FIG. 2 is a view on an enlarged scale along the line II-II of FIG. 1.

This ejection system comprises a first plurality of openings or nozzles shown by A, for the discharge of a liquid, provided in the frame 3. The arrangement is such that each side of the frame has at least one liquid discharge opening or nozzle A and preferably a plurality of such openings or nozzles. The openings or nozzles A are oriented towards the external surface of the panel W as can be seen in FIG. 2 in particular.

A second plurality of openings or nozzles, shown by B, is provided in the frame 3 for the discharge of a gaseous fluid, in particular air.

In the case of the openings or nozzles B as well, the arrangement is such that each side of the frame 3 has at least one of these openings or nozzles and preferably a plurality thereof.

In the embodiment shown by way of example, the openings or nozzles A are substantially alternate or interspersed with respect to the openings or nozzles B. This arrangement is not, however, mandatory and the number of nozzles B for the discharge of the gaseous fluid could in particular be lower than the number of openings or nozzles A.

With reference to FIG. 2, the frame 3 is provided with a first manifold duct, shown by 5, communicating with at least part of the openings or nozzles A. In alternative embodiments, the frame 3 may be provided with a plurality of manifold ducts, each of which is connected to a particular group of openings or nozzles A for the discharge of liquid.

Similarly, again with reference to FIG. 2, the frame 3 is provided with at least a second manifold duct 6 communicating with at least part of the openings or nozzles B for the discharge of gaseous fluid.

The openings or nozzles B are also oriented towards the external surface of the panel W.

With reference to FIG. 1, at least the one manifold duct 5 is connected by tubing 7 to an apparatus 8 for the supply of a flow of liquid, in particular water, preferably heated and possibly with detergent agents added to it.

In the embodiment shown by way of example in FIG. 1, the apparatus 8 comprises a container or tank 9 containing water which is taken up and supplied to the tubing 7 and then to the manifold 5 by means of an electric pump 10 of known type.

The container or tank 9 may be advantageously associated with a heating device 11, such as an electrical resistance heater, or a heat exchanger. A temperature sensor 12 may be disposed in the tank 9 to detect the temperature of the water contained therein.

In the case of an automobile vehicle provided with fuel cells, the exhaust water produced by these cells may be used at least partially to supply the tank 9.

The pump 10, the heating device 11 and the temperature sensor 12 are connected to an electronic control unit ECU with which the rain sensor 4 is also associated.

At least the one manifold duct 6 is connected, via ducting shown by 13 in FIG. 1, with a device 14 supplying a flow of gaseous fluid, in particular air. The device 14 may for instance be a compressor.

The device 14 is also controlled by the electronic control unit ECU.

The cleaning system associated with the panel W as shown in FIGS. 1 and 2 operates substantially as follows.

The presence of rain on the panel W is detected by the sensor 4 and this condition activates the control unit ECU.

The rain which is falling on the external surface of the panel W is readily removed as a result of the hydrophobic and water-repellent nature of this surface.

The hydrophobic effect is such that the droplets of water falling on the panel are divided into glomerules which do not manage to adhere to the surface of the panel but, as a result of even a minimal stress, "roll" on the panel surface, substantially without leaving residues and taking with them any particles such as dust or other contaminants which they have incorporated.

The stress on the glomerules rolling on the panel surface may simply be that of the "wind" striking the panel as a result of the forward movement of the automobile vehicle.

When the vehicle is stationary or moving at low speed, the control unit ECU selectively activates the pump 10 and/or the air supply device 14 in order to cause jets of water and/or air to be transmitted through the openings or nozzles A and/or B towards the external surface of the panel. The action of these jets of liquid and air, preferably combined together, is able to cause a turbulent movement of the liquid on the external water-repellent surface of the panel W and of any material (dirt) incorporated in this liquid.

The control unit ECU may also be connected to a control device 15 (FIG. 1) which is, for instance, manually actuated, and is adapted to cause, via the unit ECU, the actuation of the pump 10 and/or the air supply device 14 when the user of the automobile vehicle wishes to clean the panel W for instance when starting to use the automobile vehicle after a prolonged stationary period.

Advantageously, the electronic unit ECU is adapted to modulate the flow and/or pressure of the water supplied via the openings or nozzles A and the air supplied via the openings or nozzles B as a function of the speed of forward movement of the automobile vehicle. This enables optimum energy management of the cleaning system as the speed of the automobile vehicle varies.

Moreover, the control unit ECU may also be advantageously adapted to cause, via the pump 10, the supply to the manifold duct 5 of a quantity of water adapted to keep it substantially full during periods in which the cleaning system is not operational, so that when the cleaning system is subsequently actuated, the system reacts in a substantially immediate manner.

Figure 3:
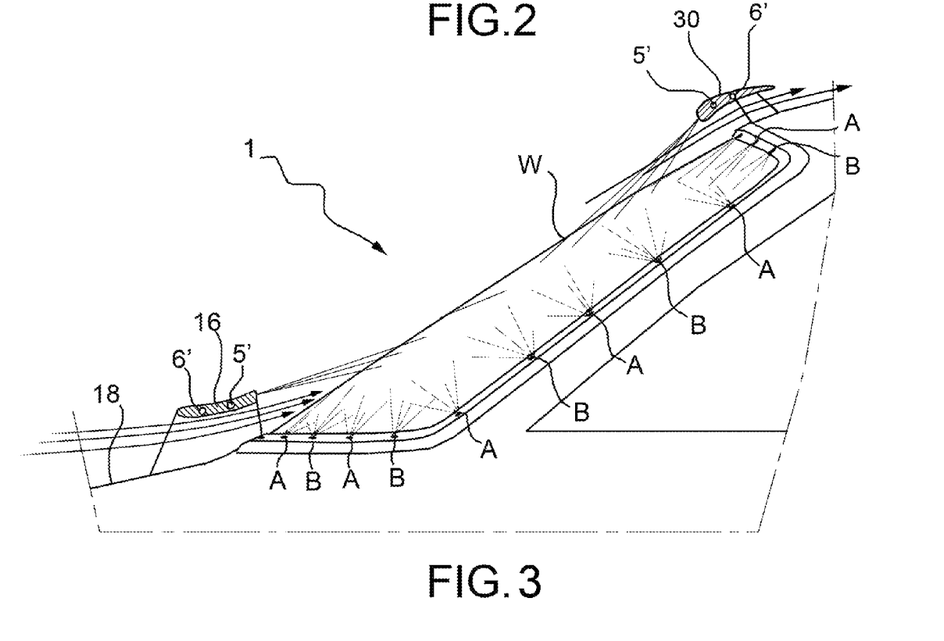
FIGS. 3 and 4 are side views of a windscreen of an automobile vehicle provided with a cleaning system according to two variants.

FIG. 3 shows a variant. In FIG. 3, parts and components already described bear the same reference numerals and letters as above.

In the embodiment of FIG. 3, the panel W is the windscreen of the automobile vehicle and a crossbar 16 is mounted in front of the lower portion of this windscreen W, the cross section of this crossbar corresponding substantially to that of an upturned aerofoil, i.e. with the extrados facing downwards and the intrados facing upwards.

The crossbar 16 is disposed in a raised position with respect to the adjacent portion of the cover 18 of the engine space so that during the movement of the vehicle a flow of air is forced along the extrados of the crossbar in order to strike the external surface of the windscreen W thereby intensifying the action of the "wind" generated by the forward movement of the vehicle.

Preferably, although not necessarily, at least one discharge nozzle for liquid and at least one discharge nozzle for air, connected to respective manifolds 5' and 6' provided within the crossbar 16, are advantageously provided in the edge of the crossbar 16 facing the windscreen W. These manifolds 5', 6' are advantageously connected to respective devices for the supply of a flow of water and air respectively, preferably the same devices associated with the manifold ducts 5, 6 of the frame or gasket 3 of the windscreen.

In this way, in addition to its aerodynamic effect, the crossbar 16 makes it possible to direct jets of liquid and/or water towards the external surface of the windscreen W, in order to improve the turbulence properties of the flows of water/air on the surface of the windscreen thereby improving the efficiency with which the glomerules of water and the particles incorporated therein are removed.

The windscreen W of FIG. 3 may advantageously be associated with an upper crossbar 30 whose cross section corresponds substantially to an aerofoil, with its extrados facing upwards. This crossbar makes it possible to oppose the tendency of the sheet or layer of air (rising up the windscreen surface) to "move away" from this surface at the summit of the windscreen.

The crossbar 30 may also be advantageously provided with nozzles for the emission of jets of liquid(s) and/or gas(es) towards the external surface of the windscreen with angles of incidence which are greater and more efficient with respect to the perimetral jets A and B which are more or less tangential.

Figure 4:
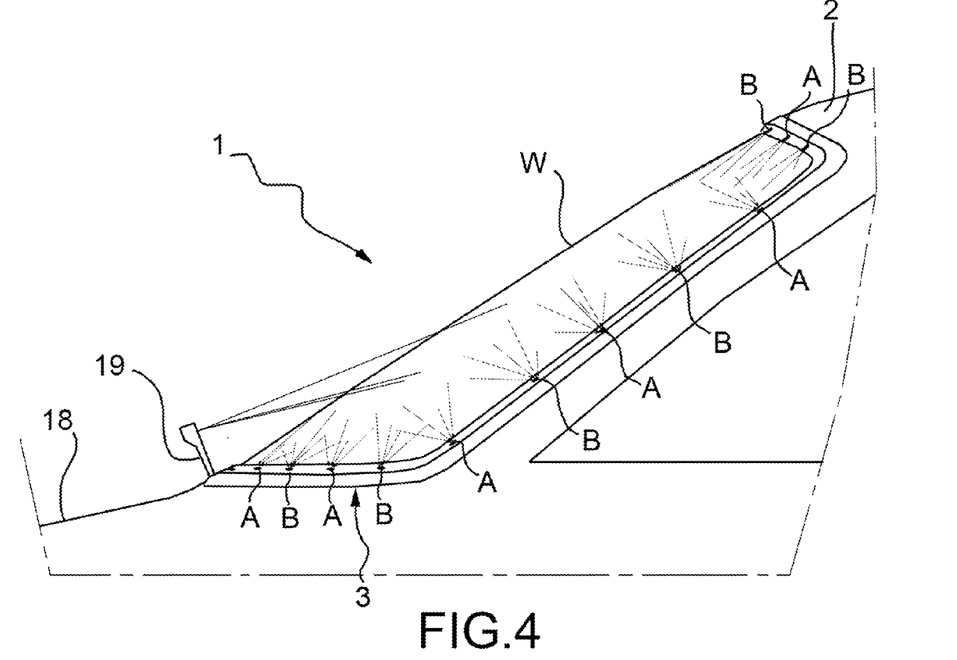

FIG. 4 shows a further variant. In FIG. 4 as well, parts and components already described again bear the same reference numerals and letters as above.

In the variant of FIG. 4, a spray device 19 adapted to direct a flow of water towards the panel W to increase the turbulence properties of the flow of water/air on the surface of this panel is provided in the vicinity of the lower side of the panel W, which may be the windscreen or the rear window.

The spray device 19 may be of the "pop-up" type similar to the devices used to clean the headlights or taillights of an automobile vehicle.

In a manner which is not shown, the frame 3 of the panel W may be provided with a plurality of manifold ducts for liquids, connected to respective discharge openings or nozzles, in order to enable a plurality of liquids having different chemical and/or physical properties, for instance water (possibly heated) and a washing or rinsing agent, to be ejected towards the panel.

Figure 5:
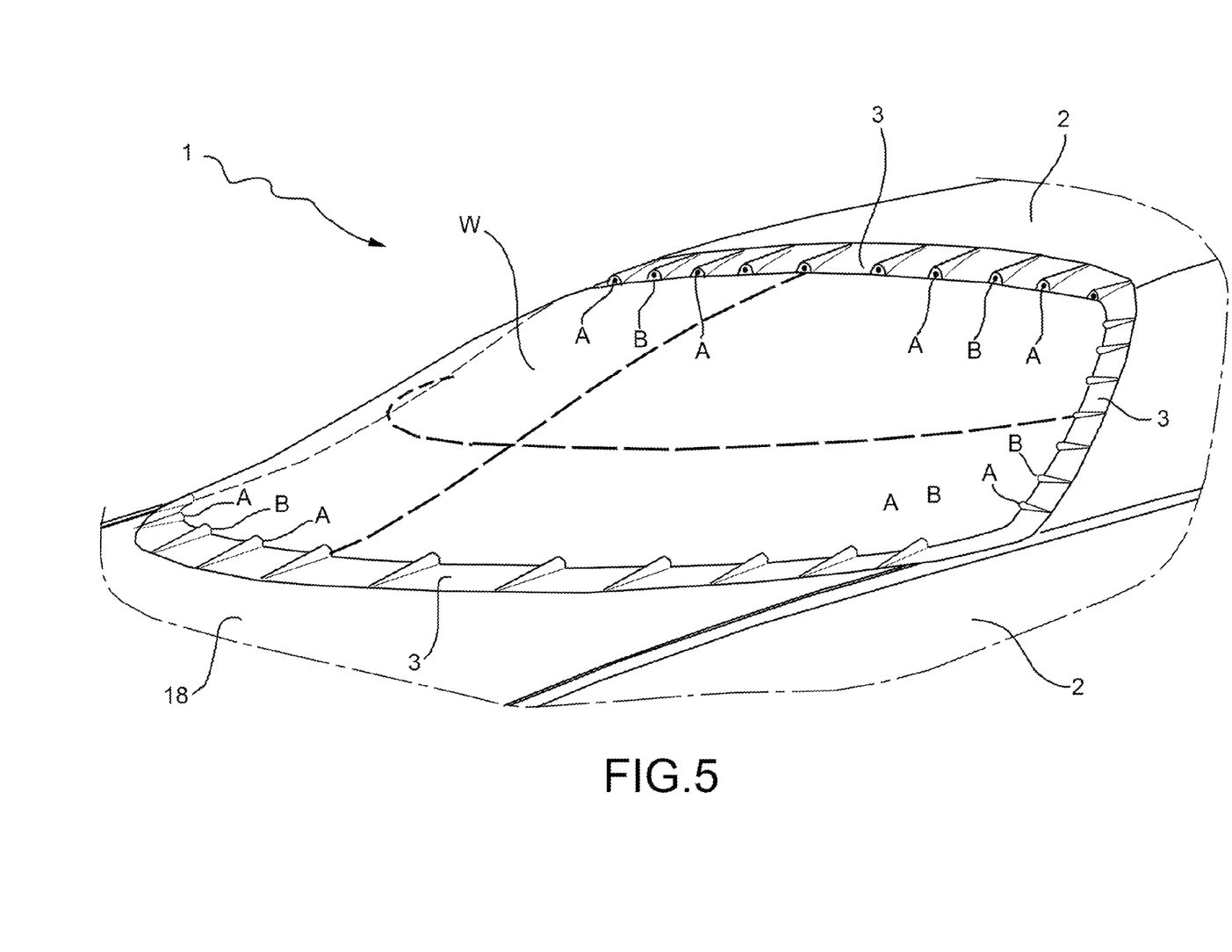
FIG. 5 is a perspective view of a windscreen with triple curvature provided with a cleaning system of the invention.

FIG. 5 shows a windscreen W with triple curvature which is associated with a cleaning system of the invention. This windscreen has a convex curvature in the sections running in horizontal planes, and a double concave-convex curvature with an intermediate flexure in the sections running in longitudinal vertical planes. This shape of the windscreen W makes it possible optimally to exploit, from the aerodynamic point of view, the action of the "wind" due to the forward movement of the vehicle.

Figure 6:
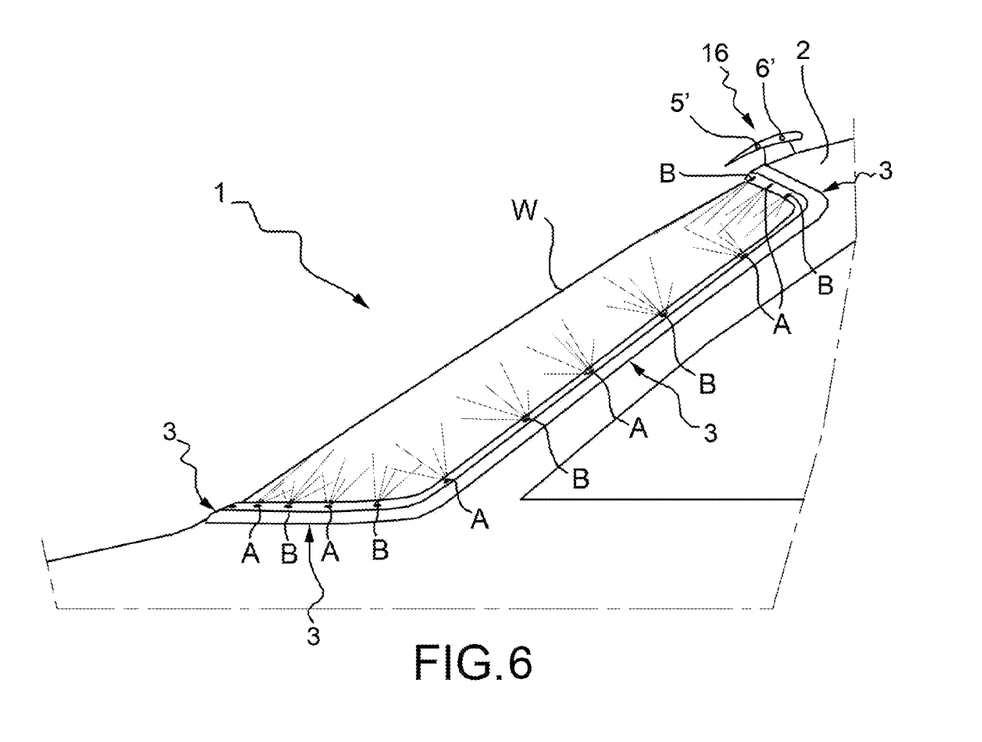
FIG. 6 is a side view of a rear window of an automobile vehicle provided with a cleaning system of the invention.

FIG. 6 shows a further variant. In FIG. 6, parts and components already described again bear the same reference numerals and letters as above.

In the variant of FIG. 6, the panel W is a rear window in the vicinity of the upper side of which a crossbar 16 is mounted, whose cross-section may be substantially that of an aerofoil.

The crossbar 16 is disposed such that during the forward movement of the vehicle a flow of air is forced along the intrados of the crossbar in order to strike the external surface of the rear window W.

Advantageously, although not necessarily, at least one discharge nozzle for liquid and at least one discharge nozzle for air, connected to respective manifolds 5' and 6' provided within the crossbar 16, are provided in the edge of the crossbar 16 facing the rear window W. These manifolds 5', 6' are advantageously connected to respective devices for the supply of a flow of water and air respectively, preferably the same devices associated with the manifold ducts 5, 6 of the frame or gasket 3 of the windscreen.

In this way, in addition to its aerodynamic effect, the crossbar 16 makes it possible to direct jets of liquid and/or air towards the external surface of the rear window W, in order to improve the turbulence properties of the flows of water/air on this surface, thereby improving the efficiency with which the glomerules of water and the particles incorporated therein are removed.

Naturally, the principle of the invention remaining the same, the forms of embodiment and details of construction may be varied widely with respect to those described and illustrated, which have been given purely by way of example, without thereby departing from the scope of the invention as defined in the appended claims.

As mentioned above, the invention is not just advantageously applied to the windscreen or rear window, but may be advantageously applied to a whole range of glazed surfaces or the like of an automobile vehicle, such as the panes of the side lights, any transparent roof and the external surfaces of lighting units.

The invention claimed is:

1. An automobile vehicle (1) having a bodywork (2) in which a member or panel (W) is mounted and is operationally cleaned without wipers, a frame (3) being associated with its perimeter or contour, the surface of the member or panel (W) which is external in operation being water-repellent, and ejector means (A, B) being associated with the member or panel (W) in order to direct a plurality of jets of fluid towards its external surface, characterized in that the ejector means comprise a first plurality of openings or nozzles (A) for the discharge of a liquid provided in the frame (3) such that each side of the frame (3) comprises at least one opening or nozzle (A), the openings or nozzles (A) being oriented towards the external surface of the member or panel (W), a second plurality of openings or nozzles (B) for the discharge of a gaseous fluid also provided in the frame (3) and interspersed with the openings or nozzles (A) of the first plurality such that each side of the frame (3) comprises at least one opening or nozzle (B) for the discharge of a gaseous fluid, at least a first manifold duct (5) provided in the frame (3) and communicating with at least part of the liquid discharge openings or nozzles (A), at least a second manifold duct (6) provided in the frame (3) and communicating with at least part of the discharge openings or nozzles (B) of the second plurality, the first and second manifold ducts (5, 6) being connected to respective supply means (10, 14) adapted to supply them with a flow of liquid and a flow of gaseous fluid respectively, the arrangement being such that in operation the preferably combined action of the jets of liquid and gaseous fluid emitted through the openings or nozzles (A, B) is adapted to cause a turbulent movement of the liquid on the external surface of the member or panel (W) and of the materials which may be incorporated in this liquid.

2. An automobile vehicle according to claim 1, wherein the frame (3) is provided with a plurality of manifold ducts (5) for liquids which may be connected to respective openings or nozzles (A) in order to enable a plurality of liquids having different chemical and/or physical properties to be ejected towards the member or panel (W).

3. An automobile vehicle according to claim 1, wherein the frame (3) is a gasket for sealing and/or mounting the member or panel (W) in the bodywork (2).

4. An automobile vehicle according to claim 1, wherein the frame (3) is of metal material.

5. An automobile vehicle according to claim 1, wherein the frame (3) is integral with the bodywork (2).

6. An automobile vehicle according to claim 1, wherein the external surface of the member or panel (W) is provided with a nanostructured transparent film such that it has hydrophobic properties.

7. An automobile vehicle according to claim 1, wherein a layer of fragmenting nanopowder, which may be activated by electrical pulses, is deposited on the external surface of the member or panel.

8. An automobile vehicle according to claim 1, wherein nanomotor devices adapted to move micro and nano particles deposited on the surface of the member or panel (W) are associated with the external surface of the member or panel (W).

9. An automobile vehicle according to claim 1, wherein rain sensors (4), made from films deposited on the member or panel (W), are associated with the member or panel (W).

10. An automobile vehicle according to claim 1, wherein a crossbar (16) is disposed in front of the member or panel (W) in order to direct a flow of accelerated air towards the member or panel (W) when the automobile vehicle is in motion.

11. An automobile vehicle according to claim 10, wherein the member or panel (W) is a windscreen and a further crossbar (30) is disposed in the vicinity of its upper end and is adapted to impede the tendency of the sheet or layer of air which strikes the windscreen in operation to move or lift away from the surface of the windscreen (W).

12. An automobile vehicle according to claim 10, wherein the crossbar (16; 30) is provided with openings or nozzles for the supply of jets of liquid and/or gaseous fluid towards the external surface of the member or panel (W).

13. An automobile vehicle according to claim 12, wherein the openings or nozzles of the crossbar (16) are connected to manifold ducts (5', 6') disposed within the crossbar (16) and preferably connected to the supply means (10, 14) connected to the manifold ducts (5, 6) of the frame (3).

14. An automobile vehicle according to claim 1, wherein the member or panel (W) is associated with at least one spray device (19) disposed in the vicinity of one side of the member or panel (W) and adapted to direct a flow of fluid towards the external surface of the member or panel (W).

15. An automobile vehicle according to claim 1, wherein the member or panel (W) is a windscreen, a rear window, a fixed or moving pane of a window or a roof panel which is at least partially transparent, or another member with a glazed surface of the automobile vehicle.

16. An automobile vehicle according to claim 1, wherein the member or panel (W) is a windscreen which is shaped such that it has an aerodynamic configuration with triple curvature.

17. An automobile vehicle according to claim 10, wherein the member or panel (W) is a windscreen and the crossbar (16) is shaped in the form of an upturned aerofoil.

18. An automobile vehicle according to claim 11, wherein the further crossbar (30) is shaped in the form of an aerofoil.

* * * * *